United States Patent
Kato et al.

(10) Patent No.: US 12,506,231 B2
(45) Date of Patent: Dec. 23, 2025

(54) ADHESIVE FILM FOR METAL TERMINAL, METHOD FOR MANUFACTURING ADHESIVE FILM FOR METAL TERMINAL, METAL TERMINAL WITH ADHESIVE FILM FOR METAL TERMINAL, POWER STORAGE DEVICE USING SAID ADHESIVE FILM FOR METAL TERMINAL, AND METHOD FOR MANUFACTURING POWER STORAGE DEVICE

(71) Applicant: DAI NIPPON PRINTING CO., LTD., Tokyo (JP)

(72) Inventors: Takahiro Kato, Tokyo (JP); Yoichi Mochizuki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 762 days.

(21) Appl. No.: 17/774,060

(22) PCT Filed: Nov. 9, 2020

(86) PCT No.: PCT/JP2020/041774
§ 371 (c)(1),
(2) Date: May 3, 2022

(87) PCT Pub. No.: WO2021/090952
PCT Pub. Date: May 14, 2021

(65) Prior Publication Data
US 2022/0352609 A1    Nov. 3, 2022

(30) Foreign Application Priority Data

Nov. 8, 2019 (JP) .................................. 2019-203560

(51) Int. Cl.
*H01M 50/562* (2021.01)
*H01M 50/172* (2021.01)
(Continued)

(52) U.S. Cl.
CPC ....... *H01M 50/562* (2021.01); *H01M 50/172* (2021.01); *H01M 50/183* (2021.01);
(Continued)

(58) Field of Classification Search
None
See application file for complete search history.

(56) References Cited

U.S. PATENT DOCUMENTS

| | | | | |
|---|---|---|---|---|
| 2008/0213659 A1* | 9/2008 | Yamada | ................ | H01M 50/55 429/181 |
| 2013/0130007 A1* | 5/2013 | Orihara | .................. | H01G 11/74 428/218 |

(Continued)

FOREIGN PATENT DOCUMENTS

| | | |
|---|---|---|
| JP | 2004-095543 A | 3/2004 |
| JP | 2012-003960 A | 1/2012 |

(Continued)

OTHER PUBLICATIONS

Jan. 12, 2021 Search Report issued in International Patent Application No. PCT/JP2020/041774.

*Primary Examiner* — Carlos Barcena
(74) *Attorney, Agent, or Firm* — Oliff PLC

(57) ABSTRACT

An adhesive film for a metal terminal being interposed between a metal terminal electrically connected to an electrode of a power storage device element, and a power storage device external member that seals the power storage device element. The adhesive film is configured from a laminate provided with: a first polyolefin layer disposed on the metal terminal side; a base material; and a second polyolefin layer disposed on the power storage device external member side. Under the following measurement conditions, the restoration rate measured when an indenter is pressed in a vertical direction with respect to a cross section in a thickness direction of the first polyolefin layer is 46.0%

(Continued)

or greater. Restoration rate measurement conditions are a load of 10 mN, a load application speed of 1 mN/10 seconds, retention time of 10 seconds, a load releasing speed of 1 mN/10 seconds, and measurement temperature of 25° C.

20 Claims, 4 Drawing Sheets

(51) Int. Cl.
  *H01M 50/183* (2021.01)
  *H01M 50/186* (2021.01)
  *H01M 50/197* (2021.01)
  *H01G 11/74* (2013.01)
  *H01G 11/80* (2013.01)
  *H01G 11/84* (2013.01)

(52) U.S. Cl.
  CPC ....... *H01M 50/186* (2021.01); *H01M 50/197* (2021.01); *H01G 11/74* (2013.01); *H01G 11/80* (2013.01); *H01G 11/84* (2013.01)

(56) References Cited

U.S. PATENT DOCUMENTS

2016/0336553 A1* 11/2016 Takada .................... B32B 7/025
2017/0005302 A1*  1/2017 Muroi ................. H01M 50/562

FOREIGN PATENT DOCUMENTS

| JP | 2015-068923 A |   | 4/2015 |
| JP | 2015-079638 A |   | 4/2015 |
| JP | 2017033820 A  | * | 2/2017 |

* cited by examiner

Load 500 g

ADHESIVE FILM FOR METAL TERMINAL, METHOD FOR MANUFACTURING ADHESIVE FILM FOR METAL TERMINAL, METAL TERMINAL WITH ADHESIVE FILM FOR METAL TERMINAL, POWER STORAGE DEVICE USING SAID ADHESIVE FILM FOR METAL TERMINAL, AND METHOD FOR MANUFACTURING POWER STORAGE DEVICE

TECHNICAL FIELD

The present disclosure relates to an adhesive film for metal terminal, a method for manufacturing an adhesive film for metal terminal, a metal terminal with an adhesive film for metal terminal, an electrical storage device using an adhesive film for metal terminal, and a method for manufacturing an electrical storage device.

BACKGROUND ART

Various types of electrical storage devices have been developed heretofore, and in every electrical storage device, an exterior material for electrical storage devices is an essential member for sealing electrical storage device elements such as an electrode and an electrolyte. Metallic exterior materials for electrical storage devices have been often used heretofore as exterior materials for electrical storage devices, and in recent years, electrical storage devices have been required to be diversified in shape, and desired to be thinner and lighter as performance of, for example, electric cars, hybrid electric cars, personal computers, cameras and mobile phones has been enhanced. However, metallic exterior materials for electrical storage devices that have often been heretofore used have the disadvantage that it is difficult to keep up with diversification in shape, and there is a limit on weight reduction.

Thus, in recent years, a laminated sheet with a base material layer, an adhesive layer, a barrier layer and a heat-sealable resin layer laminated in this order has been proposed as an exterior material for electrical storage devices which is easily processed into diversified shapes and is capable of achieving thickness reduction and weight reduction. When such a film-shaped exterior material for electrical storage devices is used, a battery element is sealed with the packaging material by heat-welding the peripheral edge of the exterior material for electrical storage devices by heat sealing while the heat-sealable resin layers located at the innermost layer of the exterior material for electrical storage devices face each other.

A metal terminal protrudes from the heat-sealed portion of the exterior material for electrical storage devices, and the electrical storage device element sealed by the exterior material for electrical storage devices is electrically connected to the outside by a metal terminal electrically connected to an electrode of the electrical storage device element. That is, of the portion where the exterior material for electrical storage devices is heat-sealed, a portion where the metal terminal is present is heat-sealed with the metal terminal is sandwiched between heat-sealable resin layers. Since the metal terminal and the heat-sealable resin layer are composed of different materials, adhesion is likely to decrease at an interface between the metal terminal and the heat-sealable resin layer.

Thus, an adhesive film may be disposed between the metal terminal and the heat-sealable resin layer for the purpose of, for example, improving adhesion between the metal terminal and the heat-sealable resin layer. Examples of the adhesive film include those described in Patent Document 1.

PRIOR ART DOCUMENT

Patent Document

Patent Document 1: Japanese Patent Laid-open Publication No. 2015-79638

SUMMARY OF THE INVENTION

Problems to be Solved by the Invention

As an adhesive film that is disposed between a heat-sealable resin layer and a metal terminal of an exterior material for electrical storage devices, a laminated film including a polyolefin-based resin layer on both surfaces of a base film is known. In general, such a laminated film is produced by laminating a polyolefin-based resin layer to a surface of a base material film while winding the laminated film into a roll, and stored, and when needed, the laminated film is unwound from the roll, cut to a predetermined size, and used for manufacturing an electrical storage device.

However, there is a problem that when the adhesive film wound into a roll is unwound, the adhesive film retains the shape of being wound, and hardly returns to the flat shape before the adhesive film is wound, and the cut adhesive film is likely to have a curled (curved) shape. If the curl of the cut adhesive film is large, positioning in disposition of the adhesive film on a metal terminal becomes difficult.

Under these circumstances, a main object of the present disclosure is to provide an adhesive film for metal terminal in which when a flat-shaped adhesive film for metal terminal is wound into a roll and then unwound, the adhesive film for metal terminal easily returns to the flat shape before the adhesive film is wound. Further, an object of the present disclosure relates to a method for manufacturing the adhesive film for metal terminal, a metal terminal with an adhesive film for metal terminal using the adhesive film for metal terminal, an electrical storage device using the adhesive film for metal terminal, and a method for manufacturing the electrical storage device.

Means for Solving the Problem

The inventors of the present disclosure have extensively conducted studies for solving the above-described problems. As a result, the inventors have found that in an adhesive film for metal terminal including a laminated body including, in the following order: a first polyolefin layer disposed on the metal terminal side; a base material; and a second polyolefin layer disposed on the side of an exterior material for electrical storage devices, a restoration rate measured by pressing an indenter in a perpendicular direction to a thickness-direction cross-section of the first polyolefin layer is set to be equal to or less than a predetermined value under predetermined measurement conditions, whereby when a flat-shaped adhesive film for metal terminal is wound into a roll and then unwound, the adhesive film for metal terminal easily returns to the flat shape before the adhesive film is wound, and an increase in curl of the cut adhesive film can be suitably suppressed. The present disclosure is an invention that has been completed by further conducting studies based on the above-mentioned findings.

That is, the present disclosure provides an invention of an aspect as described below.

An adhesive film for metal terminal, which is interposed between a metal terminal electrically connected to an electrode of an electrical storage device element and an exterior material for electrical storage devices that seals the electrical storage device element,
- in which the adhesive film for metal terminal includes a laminated body including, in the following order: a first polyolefin layer disposed on the metal terminal side; a base material; and a second polyolefin layer disposed on the side of the exterior material for electrical storage devices, and
- a restoration rate measured by pressing an indenter in a perpendicular direction to a thickness-direction cross-section of the first polyolefin layer is 46.0% or more under the following measurement conditions.

<Restoration Rate Measurement Conditions>
- A load of 10 mN. The load is either a test load as well as a maximum load.
- A load application speed of 1 mN/10 seconds.
- A retention time of 10 seconds.
- A load releasing speed of 1 mN/10 seconds.
- The indenter is a Vickers indenter having an angle between opposite surfaces of a regular quadrangular pyramid-shaped tip end portion of 136°.
- A measurement temperature of 25° C.
- Measured value: an average of a total of eight measured values obtained by measuring ten times with the measurement location changed each time, and then excluding one maximum value and one minimum value.

Advantages of the Invention

According to the present disclosure, it is possible to provide an adhesive film for metal terminal in which when a flat-shaped adhesive film for metal terminal is wound into a roll and then unwound, the adhesive film for metal terminal easily returns to the flat shape before the adhesive film is wound. Further, an object of the present disclosure relates to a method for manufacturing the adhesive film for metal terminal, a metal terminal with an adhesive film for metal terminal using the adhesive film for metal terminal, an electrical storage device using the adhesive film for metal terminal, and a method for manufacturing the electrical storage device.

EMBODIMENTS OF THE INVENTION

The adhesive film for metal terminal according to the present disclosure is an adhesive film for metal terminal which is interposed between a metal terminal electrically connected to an electrode of an electrical storage device element and an exterior material for electrical storage devices that seals the electrical storage device element, in which the adhesive film for metal terminal includes a laminated body including, in the following order: a first polyolefin layer disposed on the metal terminal side; a base material; and a second polyolefin layer disposed on the side of the exterior material for electrical storage devices, and
- a restoration rate measured by pressing indenter in a perpendicular direction to a thickness-direction cross-section of the first polyolefin layer is 46.0% or more under the following conditions.

<Restoration Rate Measurement Conditions>
- A load of 10 mN.
- A load application speed of 1 mN/10 seconds.
- A retention time of 10 seconds.
- A load releasing speed of 1 mN/10 seconds.
- The indenter is a Vickers indenter having an angle between opposite surfaces of a regular quadrangular pyramid-shaped tip end portion of 136°.
- A measurement temperature of 25° C.
- Measured value: an average of a total of eight measured values obtained by measuring ten times with the measurement location changed each time, and then excluding one maximum value and one minimum value.

Figure 11:
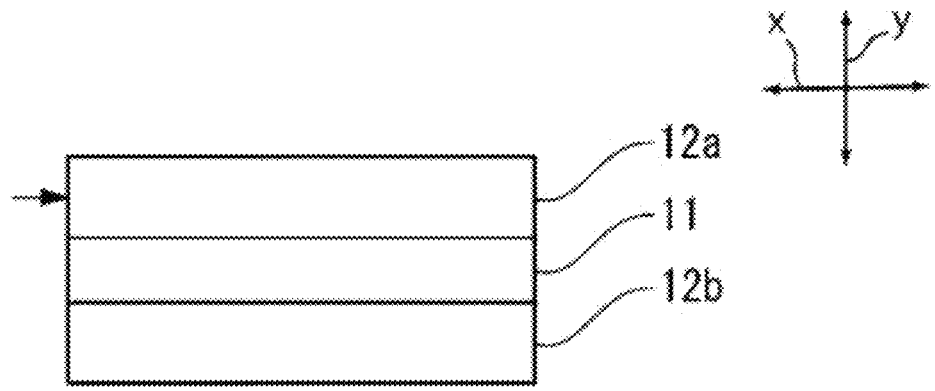
FIG. 11 is a schematic diagram for illustrating a method for measuring a restoration rate by pressing an indenter in a perpendicular direction to a thickness-direction cross-section of a first polyolefin layer of an adhesive film for metal terminal.

To a cross-section of the first polyolefin layer of the adhesive film for metal terminal in a thickness direction y (i.e. a cross-section obtained by cutting the adhesive film for metal terminal in a thickness direction), an indenter is pressed in a direction x perpendicular to the thickness direction y (arrow in FIG. 9) to measure the restoration rate as shown in the schematic diagram of FIG. 11.

In the adhesive film for metal terminal according to the present disclosure, the restoration rate of the first polyolefin layer disposed on the metal terminal side is set to 46.0% or more, and thus when a flat-shaped adhesive film for metal terminal is wound into a roll and then unwound, the adhesive film for metal terminal easily returns to the flat shape before the adhesive film is wound.

The electrical storage device of the present disclosure is an electrical storage device including: an electrical storage device element including at least a positive electrode, a negative electrode and an electrolyte; an exterior material for electrical storage devices that seals the electrical storage device element; and a metal terminal electrically connected to each of the positive electrode and the negative electrode and protruding to the outside of the exterior material for electrical storage devices, in which the adhesive film for metal terminal according to the present disclosure is interposed between the metal terminal and the exterior material for electrical storage devices. Hereinafter, the adhesive film for metal terminal, the method for manufacturing the adhesive film for metal terminal, the electrical storage device using the adhesive film for metal terminal, and the method for manufacturing the electrical storage device according to the present disclosure will be described in detail.

For the numerical range in this specification, a numerical range indicated by the term "A to B" means "A or more" and "B or less". For example, the expression of "2 to 15 mm" means 2 mm or more and 15 mm or less.

In addition, examples of the method for identifying MD of the adhesive film for metal terminal in which a cross-section of the adhesive film for metal terminal (e.g. a cross-section of the first polyolefin layer, the base material or the second polyolefin layer) is observed with an electron microscope to identify a sea-island structure. In the method, the direction parallel to a cross-section in which the average of the diameters of the island shapes in a direction perpendicular to the thickness direction of the adhesive film for metal terminal is maximum can be determined as MD. Specifically, a length-direction cross-section of the adhesive film for metal terminal and cross-sections (a total of 10 cross-sections) at angular intervals of 10 degrees from a direction parallel to the length-direction cross-section to a direction perpendicular to the length-direction cross-section are observed with an electron microscope photograph to examine sea-island structures. Next, in each cross-section, the shape of each island is observed. For the shape of each island, the linear distance between the leftmost end in a direction perpendicular to the thickness direction of the adhesive film for metal terminal and the rightmost end in the perpendicular direction is defined as a diameter y. In each cross-section, the average of the top 20 diameters y in descending order of the diameter y of the island shape is calculated. The direction parallel to a cross-section having the largest average of the diameters y of the island shapes is determined as MD.

1. Adhesive Film for Metal Terminal

The adhesive film for metal terminal according to the present disclosure is interposed between a metal terminal electrically connected to an electrode of an electrical storage device element and an exterior material for electrical storage devices for sealing the electrical storage device element. Specifically, as shown in, for example, FIGS. 1 to 3, an adhesive film 1 for metal terminal according to the present disclosure is interposed between a metal terminal 2 electrically connected to an electrode of an electrical storage device element 4 and an exterior material 3 for electrical storage devices for sealing the electrical storage device element 4. The metal terminal 2 protrudes to the outside of the exterior material 3 for electrical storage devices, and is sandwiched between the exterior materials 3 for electrical storage devices with the adhesive film 1 for metal terminal interposed between the metal terminal 2 and the exterior material 3 at a peripheral edge portion 3a of the heat-sealed exterior material 3 for electrical storage devices. In the present disclosure, the heating temperature is typically in the range of about 160 to 190° C. and the pressure is typically in the range of about 1.0 to 2.0 MPa at the time of heat-sealing the exterior material for electrical storage devices. In the step of bonding the metal terminal to the exterior material for electrical storage devices with the adhesive film interposed therebetween, heating and pressurization are performed multiple times, for example, the steps of temporary bonding and primary bonding to the metal terminal are carried out. The temporary bonding step is a step of temporarily fixing the adhesive film to the metal terminal and removing air bubbles, and the primary bonding step is a step of bonding the adhesive film to the metal terminal by performing heating and pressurizing one or more times under the condition of a higher temperature over the temporary bonding step. The step of temporarily bonding the adhesive film for metal terminal to a metal terminal is performed under the conditions of a temperature of, for example, about 140 to 160° C., a pressure of about 0.01 to 1.0 MPa, a time of about 3 to 15 seconds, and about 3 to 6 times, and the primary bonding step is performed under the conditions of, for example, a temperature of about 160 to 240° C., a pressure of about 0.01 to 1.0 MPa, a time of about 3 to 15 seconds, and about 1 to 3 times.

The adhesive film 1 for metal terminal according to the present disclosure is provided for enhancing adhesion between the metal terminal 2 and the exterior material 3 for electrical storage devices. Enhancement of adhesion between the metal terminal 2 and exterior material 3 for electrical storage devices improves the sealing property of the electrical storage device element 4. As described above, the electrical storage device element is sealed such that the metal terminal 2 electrically connected to the electrode of the electrical storage device element 4 protrudes to the outside of the exterior material 3 for electrical storage devices when the electrical storage device element 4 is heat-sealed. Here, the metal terminal 2 formed of metal and a heat-sealable resin layer 35 (a layer formed of a heat-sealable resin such as a polyolefin) located in the innermost layer of the exterior material 3 for electrical storage devices are formed of different materials, and therefore when such an adhesive film is not used, the sealing property of the electrical storage device element is likely to be low at the interface between the metal terminal 2 and the heat-sealable resin layer 35.

Figure 4:
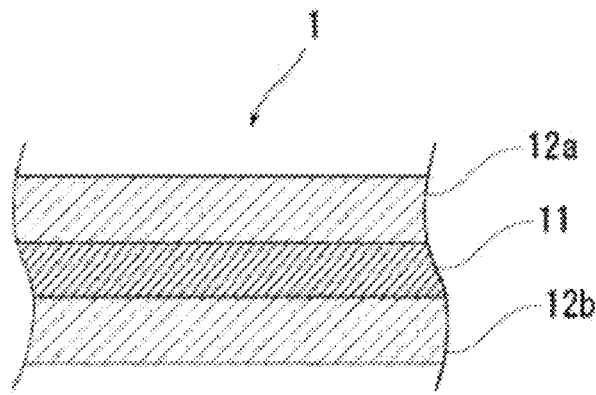
FIG. 4 is a schematic sectional view of an adhesive film for metal terminal of the present disclosure.
Figure 5:
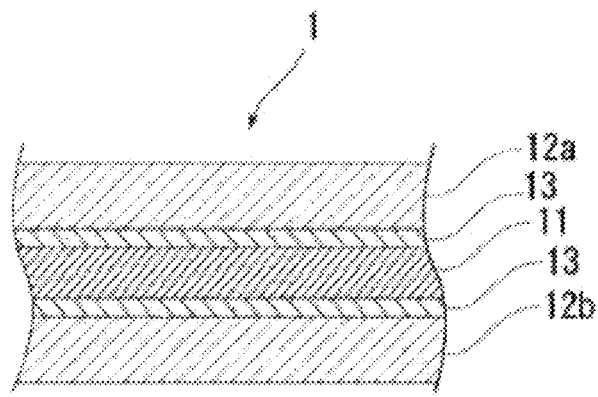
FIG. 5 is a schematic sectional view of an adhesive film for metal terminal according to the present disclosure.

As shown in FIGS. 4 and 5, the adhesive film 1 for metal terminal according to the present disclosure has a configuration in which at least a first polyolefin layer 12a, a base material 11 and a second polyolefin layer 12b are laminated in this order. The first polyolefin layer 12a is disposed on the metal terminal side. In addition, the second polyolefin layer 12b is disposed on the side of the exterior material 3 for electrical storage devices. The first polyolefin layer 12a and the second polyolefin layer 12b are located, respectively, on surfaces on both sides in the adhesive film 1 for metal terminal according to the present disclosure.

In the adhesive film 1 for metal terminal, the first polyolefin layer 12a and the second polyolefin layer 12b each contain a polyolefin-based resin. Examples of the polyolefin-based resin include polyolefins and acid-modified polyolefins. It is preferable that the first polyolefin layer 12a contains an acid-modified polyolefin, among polyolefin-based resins, and it is more preferable that the first polyolefin layer 12a is a layer formed of an acid-modified polyolefin. It is preferable that the second polyolefin layer 12b contains a polyolefin or an acid-modified polyolefin, more preferably a polyolefin, among polyolefin-based resins, and it is still more preferable that the second polyolefin layer 12b is a layer formed of a polyolefin.

It is preferable that the base material contains a polyolefin-based resin, more preferably a polyolefin, and it is still more preferable that the base material 11 is a layer formed of a polyolefin.

In each of the first polyolefin layer 12a, the second polyolefin layer 12b and the base material 11, the polyolefin-based resin is preferably a polypropylene-based resin, the polyolefin is preferably polypropylene, and the acid-modified polyolefin is preferably acid-modified polypropylene. The polyolefin-based resin such as a polyolefin and an acid-modified polyolefin may contain known additives, fillers described later, pigments, and the like.

Specific examples of the preferred laminated configuration of the adhesive film 1 for metal terminal according to the present disclosure include a three-layer configuration in which a first polyolefin layer formed of acid-modified polypropylene, a base material formed of polypropylene and a second polyolefin layer formed of polypropylene are laminated in this order; and a three-layer configuration in which a first polyolefin layer formed of acid-modified polypropylene, a base material formed of polypropylene and a second polyolefin layer formed of acid-modified polypropylene are laminated in this order. Among them, a three-layer configuration is particularly preferable in which a first polyolefin layer formed of acid-modified polypropylene/a base material formed of polypropylene/a second polyolefin layer formed of polypropylene are laminated in this order.

Materials forming the first polyolefin layer 12a, the second polyolefin layer 12b and the base material 11 will be described later in detail.

When the adhesive film 1 for metal terminal according to the present disclosure is disposed between the metal terminal 2 of the electrical storage device 10 and the exterior material 3 for electrical storage devices, the surface of the metal terminal 2 composed of metal and the heat-sealable resin layer 35 (a layer formed of a heat-sealable resin such as a polyolefin) of the exterior material 3 for electrical storage devices are bonded to each other with the adhesive film 1 for metal terminal interposed therebetween. The first polyolefin layer 12a of the adhesive film 1 for metal terminal is disposed on the metal terminal 2 side, the second polyolefin layer 12b is disposed on the side of the exterior material 3 for electrical storage devices, the first polyolefin layer 12a adheres to the metal terminal 2, and the second polyolefin layer 12b adheres to the heat-sealable resin layer 35 of the exterior material 3 for electrical storage devices.

In the adhesive film 1 for metal terminal according to the present disclosure, the restoration rate measured by pressing an indenter in a perpendicular direction to a thickness-direction cross-section of the first polyolefin layer 12a is 46.0% or more. In the adhesive film 1 for metal terminal according to the present disclosure, the first polyolefin layer 12a disposed on the metal terminal 2 side has high flexibility and a high restoration rate as described above, and thus when a flat-shaped adhesive film for metal terminal is wound into a roll and then unwound, the adhesive film for metal terminal easily returns to the flat shape before the adhesive film is wound. The conditions for measurement of the restoration rate are as follows. As pretreatment of a sample to be measured, the adhesive film for metal terminal is cut to 30 mm in MD and 15 mm in TD. Next, the sample is embedded in epoxy cold implant resin and dried for about 1 day. Thereafter, using a mechanical polishing apparatus Tegrapol-35 manufactured by Marumoto Struers K.K., a cross-section obtained by cutting in a transverse direction is polished to set the surface roughness of the cross-section of the sample to about 1.0 μm. The restoration rate is measured by an indentation method. The measurement by an indentation method can be performed using, for example, PICODENTOR HM-500 manufactured by FISCHER INSTRUMENTS K.K.

<Restoration Rate Measurement Conditions>

A load of 10 mN.
A load application speed of 1 mN/10 seconds.
A retention time of 10 seconds.
A load releasing speed of 1 mN/10 seconds.
The indenter is a Vickers indenter having an angle between opposite surfaces of a regular quadrangular pyramid-shaped tip end portion of 136°.
A measurement temperature of 25° C.
Measured value: an average of a total of eight measured values obtained by measuring ten times with the measurement location changed each time, and then excluding one maximum value and one minimum value.

The restoration rate of the first polyolefin layer 12a may be 46.0% or more, and is preferably about 47.0% or more, more preferably about 50.0% or more, still more preferably about 52.0% or more, particularly preferably about 54.0% or more because the adhesive film for metal terminal more easily returns to a flat shape. In addition, the restoration rate of the first polyolefin layer 12a is preferably about 65.0% or less, more preferably about 60.0% or less, still more preferably about 58.0% or less. The restoration rate of the first polyolefin layer 12a is preferably in the range of about 46.0 to 65.0%, about 46.0 to 60.0%, about 46.0 to 58.0%, about 47.0 to 65.0%, about 47.0 to 60.0%, about 47.0 to 58.0%, about 50.0 to 65.0%, about 50.0 to 60.0%, about 50.0 to 58.0%, about 52.0 to 65.0%, about 52.0 to 60.0%, about 52.0 to 58.0%, about 54.0 to 65.0%, about 54.0 to 60.0%, or about 54.0 to 58.0%.

In addition, the restoration rate measured by pressing an indenter in a perpendicular direction to a thickness-direction cross-section of the second polyolefin layer 12b under the restoration rate measurement conditions is preferably 46.0% or more, more preferably about 47.0% or more, still more preferably about 50.0% or more because the adhesive film for metal terminal more easily returns to a flat shape. In addition, the restoration rate of the second polyolefin layer 12b is preferably about 65.0% or less, more preferably about 60.0% or less, still more preferably about 58.0% or less. The restoration rate of the second polyolefin layer 12b is preferably in the range of about 46.0 to 65.0%, about 46.0 to 60.0%, about 46.0 to 58.0%, about 47.0 to 65.0%, about 47.0 to 60.0%, about 47.0 to 58.0%, about 50.0 to 65.0%, about 50.0 to 60.0%, or about 50.0 to 58.0%.

In addition, the restoration rate measured by pressing an indenter in a perpendicular direction to a thickness-direction cross-section of the base material 11 under the restoration rate measurement conditions is preferably 46.0% or more, more preferably about 47.0% or more, still more preferably about 50.0% or more because the adhesive film for metal terminal more easily returns to a flat shape. In addition, the restoration rate of the base material 11 is preferably about 65.0% or less, more preferably about 60.0% or less, still more preferably about 58.0% or less. The restoration rate of the base material 11 is preferably in the range of about 46.0 to 65.0%, about 46.0 to 60.0%, about 46.0 to 58.0%, about 47.0 to 65.0%, about 47.0 to 60.0%, about 47.0 to 58.0%, about 50.0 to 65.0%, about 50.0 to 60.0%, or about 50.0 to 58.0%.

In the adhesive film 1 for metal terminal according to the present disclosure, the restoration rate of each of the first polyolefin layer 12a, the second polyolefin layer 12b and the base material 11 can be adjusted by the composition, backbone, dispersibility, molecular weight, melting point and MFR of the resin forming each layer, and conditions (e.g. the extrusion width from the T-die, the draw ratio, the draw speed and the heat treatment temperature) of a T-die and inflation in manufacturing of the adhesive film 1 for metal terminal. Examples of the method for adjusting the restoration rate of the first polyolefin layer of the adhesive film for metal terminal by the composition of the first polyolefin layer 12a include a method in which a predetermined amount of a butene component, an ethylene-propylene-butene copolymer, a noncrystalline ethylene-propylene copolymer, a propylene-α-olefin copolymer or the like is added for improving flexibility.

The total thickness of the adhesive film 1 for metal terminal according to the present disclosure is, for example, about 60 µm or more, preferably about 80 µm or more, preferably about 100 µm or more, more preferably about 120 µm or more, still more preferably about 150 µm or more because the adhesive film for metal terminal more easily returns to a flat shape. In addition, the total thickness of the adhesive film 1 for metal terminal according to the present disclosure is preferably about 200 µm or less, more preferably 180 µm or less. The total thickness of the adhesive film 1 for metal terminal according to the present disclosure is preferably in the range of about 60 to 200 µm, about 60 to 180 µm, about 80 to 200 µm, about 80 to 180 µm, about 100 to 200 µm, about 100 to 180 µm, about 120 to 200 µm, about 120 to 180 µm, about 150 to 200 µm, or about 150 to 180 µm. As a more specific example, for example, the total thickness is preferably about 60 to 100 µm when the adhesive film 1 for metal terminal according to the present disclosure is used for consumer electrical storage devices, and the total thickness is preferably about 100 to 200 µm when the adhesive film 1 for metal terminal is used for vehicle-mounted power storage devices.

Hereinafter, the first polyolefin layer 12a, the second polyolefin layer 12b and the base material 11 will be described in detail.

[First Polyolefin Layer 12a and Second Polyolefin Layer 12b]

As shown in FIGS. 4 and 5, the adhesive film 1 for metal terminal according to the present disclosure includes the first polyolefin layer 12a on one side of the base material 11 and the second polyolefin layer 12b on the other side of the base material 11. The first polyolefin layer 12a is disposed on the metal terminal 2 side. In addition, the second polyolefin layer 12b is disposed on the side of the exterior material 3 for electrical storage devices. The first polyolefin layer 12a and the second polyolefin layer 12b are located, respectively, on surfaces on both sides in the adhesive film 1 for metal terminal according to the present disclosure.

In the adhesive film 1 for metal terminal, the first polyolefin layer 12a and the second polyolefin layer 12b each contain a polyolefin-based resin. Examples of the polyolefin-based resin include polyolefins and acid-modified polyolefins. It is preferable that the first polyolefin layer 12a contains an acid-modified polyolefin, among polyolefin-based resins, and it is more preferable that the first polyolefin layer 12a is a layer formed of an acid-modified polyolefin. It is preferable that the second polyolefin layer 12b contains a polyolefin or an acid-modified polyolefin, more preferably a polyolefin, among polyolefin-based resins, and it is still more preferable that the second polyolefin layer 12b is a layer formed of a polyolefin. The acid-modified polyolefin has high affinity for a metal. In addition, the polyolefin has high affinity for a heat-weldable resin such as a polyolefin. Therefore, in the adhesive film 1 for metal terminal according to the present disclosure, further excellent adhesion can be exhibited at an interface between the adhesive film 1 for metal terminal and the metal terminal 2 by disposing the first polyolefin layer 12a formed of an acid-modified polyolefin on the metal terminal 2 side. In addition, excellent adhesion can be exhibited at an interface between the adhesive film 1 for metal terminal and the heat-sealable resin layer 35 by disposing the second polyolefin layer 12b formed of a polyolefin on the heat-sealable resin layer 35 side of the exterior material 3 for electrical storage devices.

Specific examples of the preferred laminated configuration of the adhesive film 1 for metal terminal according to the present disclosure include a three-layer configuration in which a first polyolefin layer formed of acid-modified polypropylene, a base material formed of polypropylene and a second polyolefin layer formed of polypropylene are laminated in this order; and a three-layer configuration in which a first polyolefin layer formed of acid-modified polypropylene, a base material formed of polypropylene and a second polyolefin layer formed of acid-modified polypropylene are laminated in this order. Among them, a three-layer configuration is particularly preferable in which a first polyolefin layer formed of acid-modified polypropylene/a base material formed of polypropylene/a second polyolefin layer formed of polypropylene are laminated in this order.

The acid-modified polyolefin is not particularly limited as long as it is a polyolefin modified with an acid, and a polyolefin graft-modified with an unsaturated carboxylic acid or an anhydride thereof is preferable.

Specific examples of the polyolefin to be acid-modified include polyethylenes such as low-density polyethylene, medium-density polyethylene, high-density polyethylene and linear low-density polyethylene; crystalline or noncrystalline polypropylene such as homopolypropylene, block copolymers of polypropylene (e.g., block copolymers of propylene and ethylene) and random copolymers of polypropylene (e.g., random copolymers of propylene and ethylene); terpolymers of ethylene-butene-propylene; and the like. Among these polyolefins, polyethylenes and polypropylene are preferable, with polypropylene being particularly preferable.

The polyolefin modified with an acid may be a cyclic polyolefin. For example, the carboxylic acid-modified cyclic polyolefin is a polymer obtained by performing copolymerization with an α,β-unsaturated carboxylic acid or an anhydride thereof replacing a part of monomers that form the cyclic polyolefin, or by block-polymerizing or graft-polymerizing an α,β-unsaturated carboxylic acid or an anhydride thereof with the cyclic polyolefin.

The cyclic polyolefin modified with an acid is a copolymer of an olefin and a cyclic monomer, and examples of the olefin as a constituent monomer of the cyclic polyolefin include ethylene, propylene, 4-methyl-1-pentene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferable, and norbornene is further preferable. Examples of the constituent monomer include styrene.

Examples of the carboxylic acid or anhydride thereof which is used for acid modification include maleic acid, acrylic acid, itaconic acid, crotonic acid, maleic anhydride and itaconic anhydride. It is preferable that a peak derived from maleic anhydride is detected when the first polyolefin layer 12a is analyzed by infrared spectroscopy. For example, when a maleic anhydride-modified polyolefin is measured by infrared spectroscopy, peaks derived from maleic anhydride are detected near wavenumbers of $1760\ cm^{-1}$ and $1780\ cm^{-1}$. When the first polyolefin layer 12a or the second polyolefin layer 12b is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

The first polyolefin layer 12a and the second polyolefin layer 12b may be each formed from one resin component alone, or may be formed from a blend polymer obtained by combining two or more resin components. Further, the first polyolefin layer 12a and the second polyolefin layer 12b may be each formed of only one layer, but may be formed of two or more layers with the same resin component or different resin components. From formability of the first polyolefin layer 12a and the second polyolefin layer 12b, it is preferable that these layers are each formed from a blend polymer obtained by combining two or more resin components. When formed from the blend polymer, it is preferable that the first polyolefin layer 12a contains acid-modified polypropylene as a main component (component contained at 50 mass % or more), and other resins at 50 mass % or less (polyethylene is preferable from the viewpoint of improving flexibility). In addition, it is preferable that the second polyolefin layer 12b contains polypropylene as a main component (component contained at 50 mass % or more), and other resins at 50 mass % or less (polyethylene is preferable from the viewpoint of improving flexibility). On the other hand, from the viewpoint of the electrolytic solution resistance of the first polyolefin layer 12a and the second polyolefin layer 12b, it is preferable that the first polyolefin layer 12a contains acid-modified polypropylene alone as a resin, and it is preferable that the second polyolefin layer 12b contains polypropylene alone as a resin.

Further, the first polyolefin layer 12a and the second polyolefin layer 12b may each contain a filler if necessary. When the first polyolefin layer 12a and the second polyolefin layer 12b contain a filler, a short circuit between the metal terminal 2 and a barrier layer 33 of the exterior material 3 for electrical storage devices can be effectively suppressed because the filler functions as a spacer. The particle size of the filler is in the range of about 0.1 to 35 µm, preferably about 5.0 to 30 µm, more preferably about 10 to 25 µm. In addition, the contents of the fillers based on 100 parts by mass of resin components forming the first polyolefin layer 12a and the second polyolefin layer 12b, respectively, are each about 5 to 30 parts by mass, more preferably about 10 to 20 parts by mass.

As the filler, either an inorganic filler or an organic filler can be used. Examples of the inorganic filler include carbon (carbon, graphite), silica, aluminum oxide, barium titanate, iron oxide, silicon carbide, zirconium oxide, zirconium silicate, magnesium oxide, titanium oxide, calcium aluminate, calcium hydroxide, aluminum hydroxide, magnesium hydroxide and calcium carbonate. In addition, examples of the organic filler include fluororesins, phenol resins, urea resins, epoxy resins, acrylic resins, benzoguanamine-formaldehyde condensates, melamine-formaldehyde condensates, crosslinked products of polymethyl methacrylate, and crosslinked products of polyethylene. From the viewpoint of shape stability, rigidity and content resistance, aluminum oxide, silica, fluororesins, acrylic resins and benzoguanamine-formaldehyde condensates are preferable, and among them, spherical aluminum oxide and silica are more preferable. As a method for mixing the filler with resin components that form the first polyolefin layer 12a and the second polyolefin layer 12b, a method in which a masterbatch formed by melting and blending the resin components and the filler with a Banbury mixer or the like is adjusted to a predetermined mixing ratio; a method in which the filler is directly mixed with the resin components; or the like can be adopted.

In addition, the first polyolefin layer 12a and the second polyolefin layer 12b may each contain a pigment if necessary. As the pigment, various inorganic pigments can be used. As a specific example of the pigment, carbon (carbon, graphite) exemplified as the filler can be preferably exemplified. Carbon (carbon, graphite) is a material generally used inside an electrical storage device, and there is no possibility of being dissolved in an electrolytic solution. In addition, the carbon has a high coloring effect, allows a sufficient coloring effect to be obtained with an addition amount small enough not to hinder bondability, is not melted by heat, and is capable of increasing the apparent melt viscosity of the resin added. Further, it is possible to impart an excellent sealing property between the exterior material for electrical storage devices and the metal terminal by preventing a pressed portion from being thinned during thermal bonding (heat-sealing).

When a pigment is added to each of the first polyolefin layer 12a and the second polyolefin layer 12b, for example, the addition amounts of the pigments based on 100 parts by mass of resin components forming the first polyolefin layer 12a and the second polyolefin layer 12b, respectively, are each about 0.05 to 0.3 parts by mass, preferably about 0.1 to 0.2 parts by mass, when carbon black having a particle size of about 0.03 µm is used. By adding a pigment to the first polyolefin layer 12a and the second polyolefin layer 12b, the presence or absence of the adhesive film 1 for metal terminal can be detected by a sensor, or can be visually inspected. It is particularly preferable that the first polyolefin layer 12a contains a pigment. When a filler and a pigment are added to the first polyolefin layer 12a and the second polyolefin layer 12b, the filler and the pigment may be added to the first polyolefin layer 12a and the second polyolefin layer 12b identically, and from the viewpoint of ensuring that the heat-weldability of the adhesive film 1 for metal terminal, it is preferable that the filler and the pigment are added separately between the first polyolefin layer 12a and the second polyolefin layer 12b.

From the viewpoint of satisfying the above-described restoration rate, so that the adhesive film for metal terminal more easily returns to a flat shape, the melt mass flow rate (MFR) of each of the first polyolefin layer 12a and the second polyolefin layer 12b at 230° C. is preferably about 5 g/10 min or more, more preferably about 7 g/10 min or more, still more preferably about 8 g/10 min or more, and preferably about 11 g/10 min or less, more preferably about 10 g/10 min or less, and is preferably in the range of about 5 to 11 g/10 min, about 5 to 10 g/10 min, about 7 to 11 g/10 min, about 7 to 10 g/10 min, about 8 to 11 g/10 min, or about 8 to 10 g/10 min. The melt mass flow rate (MFR) of each of the first polyolefin layer 12a and the second polyolefin layer 12b is a value (g/10 min) measured at 230° C. in accordance with the provision of JIS K 7210-1: 2014 (ISO 1133-1: 2011). When the first polyolefin layer 12a is an acid-modified polyolefin layer, it is particularly preferred that the MFR value of the acid-modified polyolefin layer satisfies the above-described value.

From the viewpoint of satisfying the above-described restoration rate, so that the adhesive film for metal terminal more easily returns to a flat shape, the melting point of the first polyolefin layer 12a is preferably about 120° C. or higher, more preferably about 130° C. or higher, and preferably about 160° C. or lower, more preferably about 150° C. or lower, and is preferably in the range of about 120 to 160° C., about 120 to 150° C., about 130 to 160° C., or about 130 to 150° C. From the viewpoint of satisfying the above-described restoration rate, so that the adhesive film for metal terminal more easily returns to a flat shape, the melting point of the second polyolefin layer 12b is preferably about 120° C. or higher, more preferably about 130° C. or higher, and preferably about 160° C. or lower, more preferably about 150° C. or lower, and is preferably in the range of about 120 to 160° C., about 120 to 150° C., about 130 to 160° C., or about 130 to 150° C. The melting point is an endothermic peak measured with a differential scanning calorimeter (DSC).

From the viewpoint of satisfying the above-described restoration rate, so that the adhesive film for metal terminal more easily returns to a flat shape, the thickness of each of the first polyolefin layer 12a and the second polyolefin layer 12b is preferably about 10 μm or more, more preferably about 15 μm or more, still more preferably about 20 μm or more, even more preferably about 30 μm or more, and, for example, about 80 μm or less, preferably about 60 μm or less, more preferably about 50 μm or less. The thicknesses of each of the first polyolefin layer 12a and the second polyolefin layer 12b is preferably in the range of about 10 to 80 μm, about 10 to 60 μm, about 10 to 50 μm, about 15 to 80 μm, about 15 to 60 μm, about 15 to 50 μm, about 20 to 80 μm, about 20 to 60 μm, about 20 to 50 μm, about 30 to 80 μm, about 30 to 60 μm, or about 30 to 50 μm. As a more specific example, for example, the thickness of each of the first polyolefin layer 12a and the second polyolefin layer 12b is preferably about 10 to 30 μm when the adhesive film 1 for metal terminal according to the present disclosure is used for consumer electrical storage devices, and the thickness of each of the first polyolefin layer 12a and the second polyolefin layer 12b is preferably about 30 to 80 μm when the adhesive film 1 for metal terminal is used for vehicle-mounted power storage devices.

From the viewpoint of satisfying the above-described restoration rate, so that the adhesive film for metal terminal more easily returns to a flat shape, the ratio of the thickness of the base material 11 to the total thickness of the first polyolefin layer 12a and the second polyolefin layer 12b is preferably about 0.3 or more, more preferably about 0.4 or more, and preferably about 1.0 or less, more preferably about 0.8 or less, and is preferably in the range of about 0.3 to 1.0, about 0.3 to 0.8, about 0.5 to 1.0, about 0.5 to 0.8.

When the total thickness of the adhesive film 1 for metal terminal is 100%, the ratio of the total thickness of the first polyolefin layer 12a and the second polyolefin layer 12b is preferably about 30 to 80%, more preferably about 50 to 70%.

[Base Material Layer 11]

In the adhesive film 1 for metal terminal, the base material 11 is a layer that functions as a support for the adhesive film 1 for metal terminal.

The material that forms the base material 11 is not particularly limited as long as it has an insulation quality. Examples of the material that forms the base material 11 include polyolefin-based resins, polyamide-based resins, polyester-based resins, epoxy resins, acrylic resins, fluororesins, silicone resins, phenol resins, silicon resins, polyurethane resins, polyether imide, polycarbonate, and mixtures and copolymers thereof. Among them, polyolefin-based resins are particularly preferable. That is, the material that forms the base material 11 is preferably a resin containing a polyolefin backbone such as a polyolefin or an acid-modified polyolefin. The resin forming the base material 11 can be confirmed to contain a polyolefin backbone by an analysis method such as infrared spectroscopy or gas chromatography mass spectrometry.

As described above, it is preferable that the base material 11 contains a polyolefin-based resin, more preferably a polyolefin, and it is still more preferable that the base material 11 is a layer formed of a polyolefin. Specific examples of the polyolefin include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylenes and polypropylene are preferred, with polypropylene being more preferred. In addition, it is preferable that the base material 11 contains homopolypropylene and it is particularly preferable that the base material 11 is formed of homopolypropylene because excellent electrolytic solution resistance is obtained.

Specific examples of the polyamide include aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polymethaxylylene adipamide (MXD6); cycloaliphatic polyamides such as polyaminomethyl cyclohexyl adipamide (PACM 6); polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

Specific examples of the polyester include polyethylene terephthalate, polybutylene terephthalate, polyethylene naphthalate, polybutylene naphthalate, polyethylene isophthalate, copolymerization polyesters with ethylene terephthalate as a main repeating unit, and copolymerization polyesters with a butylene terephthalate as a main repeating unit. Specific examples of the copolymerization polyester including ethylene terephthalate as a main repeating unit include copolymer polyesters that are polymerized with ethylene isophthalate and include ethylene terephthalate as a main repeating unit (hereinafter, abbreviated as follows after polyethylene(terephthalate/isophthalate)), polyethylene(terephthalate/isophthalate), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene (terephthalate/decane dicarboxylate). Specific examples of the copolymerization polyester with butylene terephthalate as a main repeating unit include copolymer polyesters that are polymerized with butylene isophthalate and include butylene terephthalate as a main repeating unit (hereinafter, abbreviated as follows after polybutylene(terephthalate/isophthalate)), polybutylene(terephthalate/adipate), polybutylene(terephthalate/sebacate), polybutylene(terephthalate/decane dicarboxylate) and polybutylene naphthalate. These polyesters may be used alone, or may be used in combination of two or more thereof.

In addition, the base material 11 may be formed of a nonwoven fabric formed of any of the resins described above. When the base material 11 is a nonwoven fabric, it is preferable that the base material 11 is composed of the above-described polyolefin-based resin, polyamide resin or the like.

In addition, a colorant can be blended into the base material 11 so that the base material 11 is a layer containing a colorant. In addition, the light transmittance can be adjusted by selecting a resin having low transparency. When the base material 11 is a film, it is also possible to use a colored film or a film having low transparency. In addition, when the base material 11 is a nonwoven fabric, it is possible to use a nonwoven fabric using fibers or a binder containing a colorant, or a nonwoven fabric having low transparency.

The melt mass flow rate (MFR) of the base material 11 at 230° C. is preferably about 8 g/10 min or less, more preferably about 4 g/10 min or less, from the viewpoint of satisfying the above-described restoration rate, so that the adhesive film for metal terminal more easily returns to a flat shape, and the melt mass flow rate (MFR) of the base material 11 at 230° C. is preferably about 1 g/10 min or more, more preferably about 2 g/10 min or more, from the viewpoint of ensuring that the adhesive film 1 for metal terminal has excellent flexibility (rated good in the bending test described later), and is preferably in the range of about 1 to 8 g/10 min, about 1 to 4 g/10 min, about 2 to 8 g/10 min, or about 2 to 4 g/10 min. When the base material 11 is a polyolefin layer (a layer formed of a polyolefin), it is particularly preferred that the MFR value of the polyolefin layer satisfies the above-described value. The melt mass flow rate (MFR) of the base material 11 is a value (g/10 min) measured at 230° C. in accordance with the provision of JIS K 7210-1: 2014 (ISO 1133-1: 2011).

From the viewpoint of satisfying the above-described restoration rate, so that the adhesive film for metal terminal more easily returns to a flat shape, the melting point of the base material 11 is preferably about 130° C. or higher, more preferably about 150° C. or higher, and preferably about 190° C. or lower, more preferably about 170° C. or lower, and is preferably in the range of about 130 to 190° C., about 130 to 170° C., about 150 to 190° C., or about 150 to 170° C. The melting point is an endothermic peak measured with a differential scanning calorimeter (DSC).

When the base material 11 is composed of a resin film, a surface of the base material 11 may be subjected to known easy-adhesive means such as corona discharge treatment, ozone treatment or plasma treatment if necessary.

From the viewpoint of satisfying the above-described restoration rate, so that the adhesive film for metal terminal more easily returns to a flat shape, the thickness of the base material 11 is, for example, about 100 μm or less, preferably about 60 μm or less, more preferably about 55 μm or less. In addition, the thickness of the base material 11 is preferably about 20 μm or more, more preferably about 30 μm or more, still more preferably about 40 μm or more. The thickness of the base material 11 is preferably in the range of about 20 to 100 about 20 to 60 about 20 to 55 about 30 to 100 about 30 to 60 about 30 to 55 about 40 to 100 about 40 to 60 or about 40 to 55 As a more specific example, for example, the thickness of the base material 11 is preferably about 30 to 55 μm when the adhesive film 1 for metal terminal according to the present disclosure is used for consumer electrical storage devices, and the thickness of the base material 11 is preferably about 40 to 100 μm when the adhesive film 1 for metal terminal is used for vehicle-mounted power storage devices.

[Adhesion Promotor Layer 13]

The adhesion promotor layer 13 is a layer provided if necessary for the purpose of firmly bonding the base material 11 to the first polyolefin layer 12*a* and the second polyolefin layer 12*b* (see FIG. 5). The adhesion promotor layer 13 may be provided only on one side or both sides between the base material 11 and the first polyolefin layer 12*a* and second polyolefin layer 12*b*.

The adhesion promotor layer 13 can be formed using a known adhesion promotor such as an isocyanate-based adhesion promotor, a polyethyleneimine-based adhesion promotor, a polyester-based adhesion promotor, a polyurethane-based adhesion promotor or a polybutadiene-based adhesion promotor. From the viewpoint of further improving electrolytic solution resistance, it is preferable that the adhesion promotor layer is formed of an isocyanate-based adhesion promotor, among the above-mentioned adhesion promotors. As the isocyanate-based adhesion promotor, one composed of an isocyanate component selected from a triisocyanate monomer and polymeric MDI is excellent in lamination strength and undergoes little decrease in lamination strength after immersion in an electrolytic solution. In particular, it is particularly preferable to form the adhesion promotor layer from an adhesion promotor composed of triphenylmethane-4,4',4"-triisocyanate which is a triisocyanate monomer or polymethylene polyphenyl polyisocyanate which is polymeric MDI (NCO content: about 30% and viscosity: 200 to 700 mPa·s). In addition, it is also preferable to form the adhesion promotor layer from tris(p-isocyanatephenyl)thiophosphate which is a triisocyanate monomer, or a two-liquid curable adhesion promotor contain a polyethyleneimine-based resin as a main agent and polycarbodiimide as a crosslinking agent.

The adhesion promotor layer 13 can be formed by performing coating by a known coating method such as a bar coating method, a roll coating method or a gravure coating method, and drying. The coating amount of the adhesion promotor is about 20 to 100 mg/m², preferably about 40 to 60 mg/m² in the case of an adhesion promotor composed of triisocyanate, about 40 to 150 mg/m², preferably about 60 to 100 mg/m² in the case of an adhesion promotor composed of polymeric MDI, and about 5 to 50 mg/m², preferably about 10 to 30 mg/m² in the case of a two-liquid curable adhesion promotor containing polyethyleneimine as a main agent and polycarbodiimide as a crosslinking agent. The triisocyanate monomer is a monomer having three isocyanate groups per molecule, and the polymeric MDI is a mixture of MDI and a MDI oligomer obtained by polymerizing MDI, and is represented by the following formula.

[Chemical Formula 1]

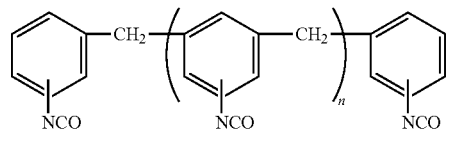

n = 0-4

The adhesive film 1 for metal terminal according to the present disclosure can be manufactured by, for example, laminating the first polyolefin layer 12*a* and the second polyolefin layer 12*b* on both surfaces, respectively, of the base material 11. The base material 11 can be laminated to the first polyolefin layer 12*a* and the second polyolefin layer 12b by a known method such as an extrusion lamination method, or a thermal lamination method. When the base material 11 is laminated to the first polyolefin layer 12a and the second polyolefin layer 12b with the adhesion promotor layer 13 interposed therebetween, for example, the adhesion promotor for forming the adhesion promotor layer 13 may be applied and dried on the base material 11 by the above-described method, followed by laminating the first polyolefin layer 12a and the second polyolefin layer 12b onto the adhesion promotor layer 13.

Figure 1:
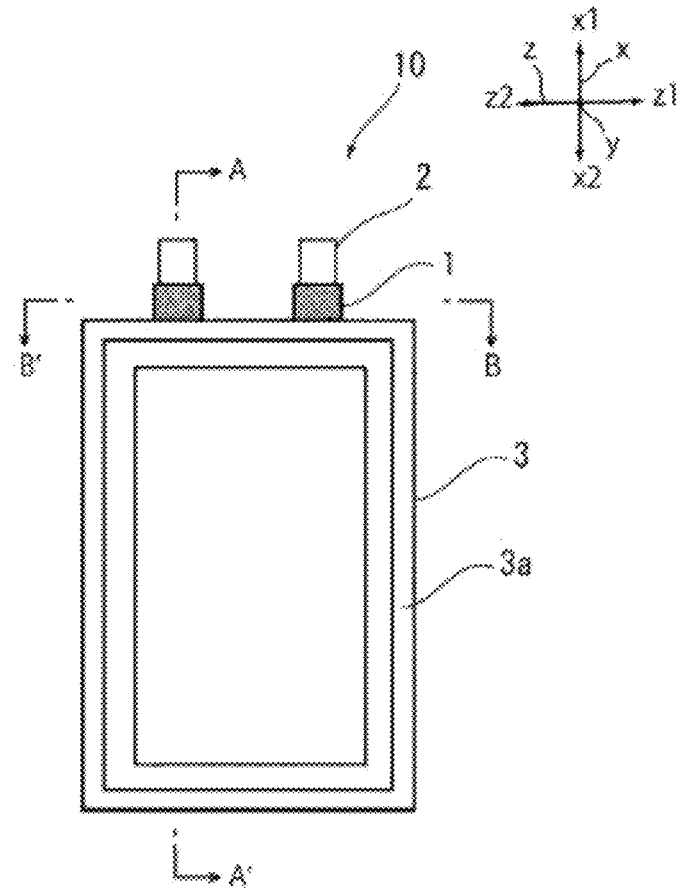
FIG. 1 is a schematic plan view of an electrical storage device of the present disclosure.
Figure 2:
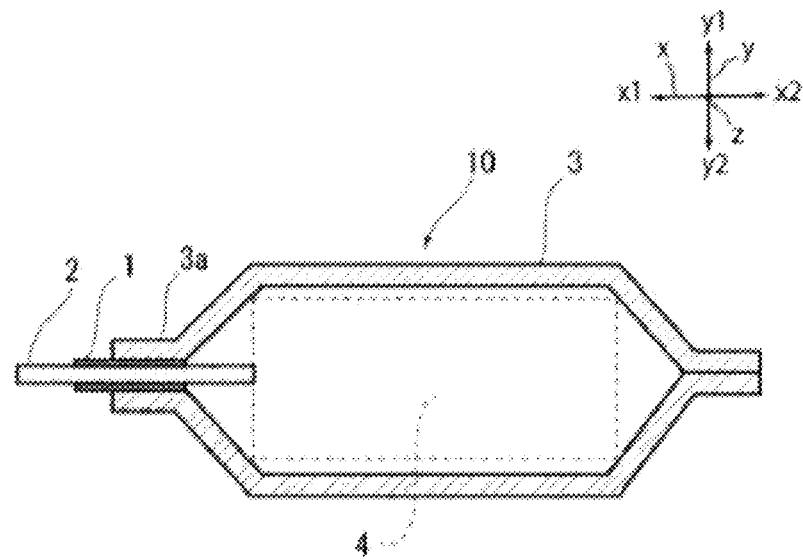
FIG. 2 is a schematic sectional view taken along line A-A' in FIG. 1.
Figure 3:
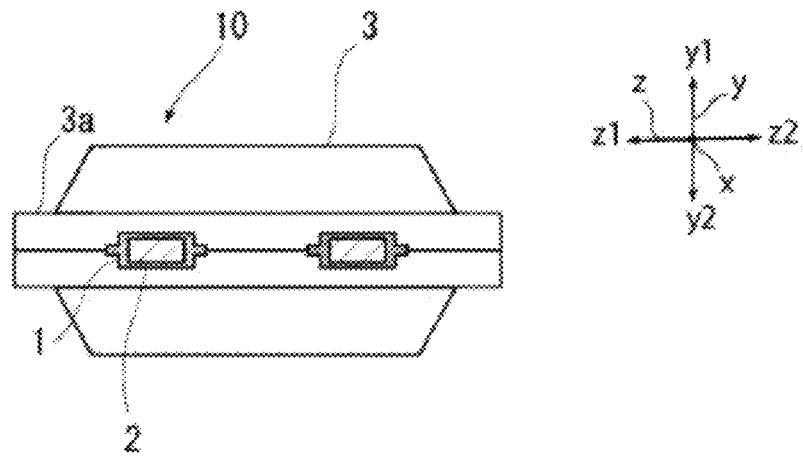
FIG. 3 is a schematic sectional view taken along line B-B' in FIG. 1.

The method for interposing the adhesive film 1 for metal terminal between the metal terminal 2 and the exterior material 3 for electrical storage devices is not particularly limited, and for example, as shown in FIGS. 1 to 3, the adhesive film 1 for metal terminal may be wound around the metal terminal 2 at a portion where the metal terminal 2 is sandwiched between the exterior materials 3 for electrical storage devices. In addition, the adhesive film 1 for metal terminal may be disposed on both sides of the metal terminal 2 so as to cross the two metal terminals 2 in a portion where the metal terminal 2 is sandwiched between the exterior materials 3 for electrical storage devices.

[Metal Terminal 2]

The adhesive film 1 for metal terminal according to the present disclosure is interposed between the metal terminal 2 and the exterior material 3 for electrical storage devices. The metal terminal 2 is a conductive member electrically connected to an electrode (positive electrode or negative electrode) of the electrical storage device element 4, and is composed of a metal material. The metal material that forms the metal terminal 2 is not particularly limited, and examples thereof include aluminum, nickel, and copper. For example, the metal terminal 2 connected to a positive electrode of a lithium ion electrical storage device is typically composed of aluminum or the like. In addition, the metal terminal 2 connected to a negative electrode of a lithium ion electrical storage device is typically composed of copper, nickel or the like.

From the viewpoint of enhancing electrolytic solution resistance, it is preferable that the surface of the metal terminal 2 is subjected to chemical conversion treatment. For example, when the metal terminal 2 is formed of aluminum, specific examples of the chemical conversion treatment include a known method in which a corrosion-resistant film of a phosphate, a chromate, a fluoride, a triazinethiol compound or the like. Among the methods for forming a corrosion-resistant film, phosphoric acid chromate treatment using a material including three components: a phenol resin, a chromium (III) fluoride compound and phosphoric acid is preferred.

The size of the metal terminal 2 may be appropriately set according to the size of an electrical storage device used. The thickness of the metal terminal 2 is preferably about 50 to 1000 more preferably about 70 to 800 In addition, the length of the metal terminal 2 is preferably about 1 to 200 mm, more preferably about 3 to 150 mm. In addition, the length of the metal terminal 2 is preferably about 1 to 200 mm, more preferably about 3 to 150 mm.

[Exterior Material 3 for Electrical Storage Devices]

Figure 6:
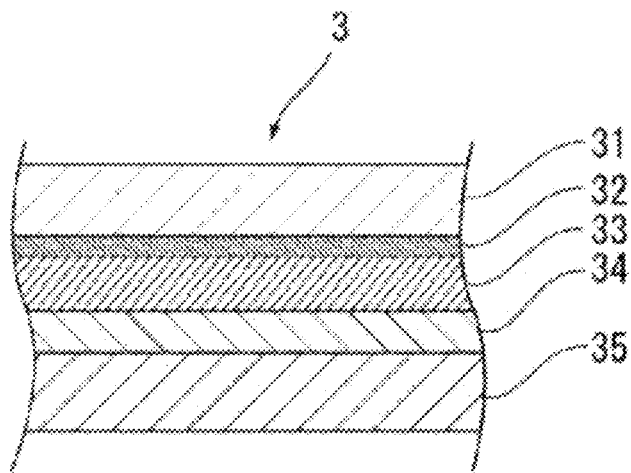
FIG. 6 is a schematic sectional view of an exterior material for electrical storage devices for electrical storage devices according to the present disclosure.
Figure 7:
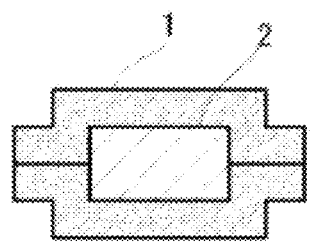
FIG. 7 is a schematic sectional view of a laminated body of adhesive film/metal terminal/adhesive film (a metal terminal with an adhesive film for metal terminal) obtained by sandwiching a metal terminal between two adhesive films and heat-welding the adhesive films in an example.

Examples of the exterior material 3 for electrical storage devices include materials having a laminated structure including a laminated body having at least a base material layer 31, a barrier layer 33, and a heat-sealable resin layer 35 in this order. FIG. 6 shows an aspect in which the base material layer 31, an adhesive agent layer 32 provided if necessary, the barrier layer 33, an adhesive layer 34 provided if necessary, and the heat-sealable resin layer 35 are laminated in this order as an example of a cross-sectional structure of the exterior material 3 for electrical storage devices. In the exterior material 3 for electrical storage devices, the base material layer 31 is on the outer layer side, and the heat-sealable resin layer 35 is an innermost layer. During construction of an electrical storage device, the heat-sealable resin layers 35 located on the peripheral edge of the electrical storage device element 4 is brought into contact with each other, and heat-welded to seal the electrical storage device element 4, so that the electrical storage device element 4 is encapsulated. FIGS. 1 to 3 show the electrical storage device 10 where the embossed-type exterior material 3 for electrical storage devices, which is molded by embossing molding, is used, but the exterior material 3 for electrical storage devices may be of non-molded pouch type. Examples of the pouch type include three-way seal, four-way seal and pillow type, and any of the types may be used.

The thickness of the laminated body forming the exterior material 3 for electrical storage devices is not particularly limited, and is preferably about 190 μm, about 180 μm or less, about 160 μm or less, about 155 μm or less, about 140 μm or less, about 130 μm or less, or about 120 μm or less from the viewpoint of cost reduction, improvement of the energy density and the like, and preferably about 35 μm or more, about 45 μm or more, about 60 μm or more, or about 80 μm or more from the viewpoint of maintaining the function of the exterior material 3 for electrical storage devices, which is protection of the electrical storage device element 4. For example, the thickness is preferably in the range of about 35 to 190 μm, about 35 to 180 μm, about 35 to 160 μm, about 35 to 155 μm, about 35 to 140 μm, about 35 to 130 μm, about 35 to 120 μm, about 45 to 190 μm, about 45 to 180 μm, about 45 to 160 μm, about 45 to 155 μm, about 45 to 140 μm, about 45 to 130 μm or more, about 45 to 120 μm, about 60 to 190 μm, about 60 to 180 μm, about 60 to 160 μm, about 60 to 155 μm, about 60 to 140 μm, about 60 to 130 μm, about 60 to 120 μm, about 80 to 190 μm, about 80 to 180 μm, about 80 to 160 μm, about 80 to 155 μm, about 80 to 140 μm, about 80 to 130 μm or about 80 to 120 μm.

(Base Material Layer 31)

In the exterior material 3 for electrical storage devices, the base material layer 31 is a layer that functions as a base material of the exterior material for electrical storage devices, and forms the outermost layer side of the exterior material for electrical storage devices.

The material that forms the base material layer 31 is not particularly limited as long as it has an insulation quality. Examples of the material that forms the base material layer 31 include polyester, polyamide, epoxy, acrylic, fluororesins, polyurethane, silicone resins, phenol, polyetherimide, polyimide and mixtures and copolymers thereof. Polyester such as polyethylene terephthalate or polybutylene terephthalate has the advantage that it is excellent in electrolytic solution resistance, so that whitening etc. due to deposition of an electrolytic solution is hard to occur, and thus the polyester is suitably used as a material for formation of the base material layer 31. In addition, a polyamide film is excellent in stretchability, can prevent occurrence of whitening due to resin breakage in the base material layer 31 during molding, and is thus suitably used as a material for formation of the base material layer 31.

The base material layer 31 may be formed of a uniaxially or biaxially stretched resin film, or may be formed of an unstretched resin film. Among them, a uniaxially or biaxially stretched resin film, particularly a biaxially stretched resin film has improved heat resistance through orientation and crystallization, and is therefore suitably used as the base material layer 31.

Among them, nylons and polyesters are preferable and biaxially stretched nylons and biaxially stretched polyesters are more preferable as resin films for formation of the base material layer 31.

The base material layer 31 can also be laminated with a resin film which is made of a different material for improving pinhole resistance, and insulation quality as a packaging of an electrical storage device. Specific examples include a multilayer structure in which a polyester film and a nylon film are laminated, and a multilayer structure in which a biaxially stretched polyester and a biaxially stretched nylon are laminated. When the base material layer 31 is made to have a multilayer structure, the resin films may be bonded with the use of an adhesive, or may be directly laminated without the use of an adhesive. Examples of the method for bonding the resin films without the use of an adhesive include methods in which the resin films are bonded in a heat-melted state, such as a co-extrusion method, a sand lamination method and a thermal lamination method.

In addition, the friction of the base material layer 31 may be reduced for improving moldability. When the friction of the base material layer 31 is reduced, the friction coefficient of the surface thereof is not particularly limited, and it is, for example, 1.0 or less. Examples of the method for reducing the friction of the base material layer 31 include matting treatment, formation of a thin film layer of a slipping agent, and a combination thereof.

The thickness of the base material layer 31 is, for example, about 10 to 50 μm, preferably about 15 to 30 μm.
(Adhesive Agent Layer 32)

In the exterior material 3 for electrical storage devices, the adhesive agent layer 32 is a layer disposed on the base material layer 31 if necessary for imparting adhesion to the base material layer 31. That is, the adhesive agent layer 32 is provided between the base material layer 31 and the barrier layer 33.

The adhesive agent layer 32 is formed from an adhesive capable of bonding the base material layer 31 and the barrier layer 33. The adhesive used for forming the adhesive agent layer 32 may be a two-liquid curable adhesive, or may be a one-liquid curable adhesive. In addition, the adhesion mechanism of the adhesive used for forming the adhesive agent layer 32 is not particularly limited, and may be any one of a chemical reaction type, a solvent volatilization type, a heat melting type, a heat pressing type and so on.

As resin components of adhesives that can be used for formation of the adhesive agent layer 32, polyurethane-based two-liquid curable adhesive agents; and polyamides, polyesters or blend resins of these resins and modified polyolefins are preferable because they are excellent in spreadability, durability and a yellowing inhibition action under high-humidity conditions, a thermal degradation inhibition action during heat-sealing, and so on, and effectively suppress occurrence of delamination by inhibiting a reduction in lamination strength between the base material layer 31 and the barrier layer 33.

The adhesive agent layer 32 may be made multilayered with different adhesive components. When the adhesive agent layer 32 is made multilayered with different components, it is preferable that a resin excellent in bondability to the base material layer 31 is selected as an adhesive component to be disposed on the base material layer 31 side, and an adhesive component excellent in bondability to the barrier layer 33 is selected as an adhesive component to be disposed on the barrier layer 33 side, from the viewpoint of improving lamination strength between the base material layer 31 and the barrier layer 33. When the adhesive agent layer 32 is made multilayered with different adhesive components, specific examples of the preferred adhesive component to be disposed on the barrier layer 33 side include acid-modified polyolefins, metal-modified polyolefins, mixed resins of polyesters and acid-modified polyolefins, and resins containing a copolymerization polyester.

The thickness of the adhesive agent layer 32 is, for example, about 2 to 50 μm, preferably about 3 to 25 μm.
(Barrier Layer 33)

In the exterior material for electrical storage devices, the barrier layer 33 is a layer which is intended to improve the strength of the exterior material for electrical storage devices and which has a function of preventing ingress of water vapor, oxygen, light and the like into the electrical storage device. The barrier layer 33 is preferably a metal layer, i.e. a layer formed of a metal. Specific examples of the metal forming the barrier layer 33 include aluminum, stainless and titanium, with aluminum being preferred. The barrier layer 33 can be formed from, for example, a metal foil, a metal vapor-deposited film, an inorganic oxide vapor-deposited film, a carbon-containing inorganic oxide vapor-deposited film, a film provided with any of these vapor-deposited films, or the like, and is formed preferably from a metal foil, more preferably from an aluminum foil. From the viewpoint of preventing generation of wrinkles and pinholes in the barrier layer 33 during manufacturing of the exterior material for electrical storage devices, it is more preferable to form the barrier layer from a soft aluminum foil such as annealed aluminum (JIS H4160: 1994 A8021H-O, JIS H4160: 1994 A8079H-O, JIS H4000:2014 A8021P-O, JIS H4000:2014 A8079P-O).

The thickness of the barrier layer 33 is preferably about 10 to 200 more preferably about 20 to 100 from the viewpoint of making pinholes less likely to be generated by molding while thinning the exterior material for electrical storage devices.

In addition, at least one surface, preferably both surfaces, of the barrier layer 33 are subjected to a chemical conversion treatment for stabilization of bonding, prevention of dissolution and corrosion, and so on. Here, the chemical conversion treatment is a treatment for forming a corrosion-resistant film on the surface of the barrier layer.
(Adhesive Layer 34)

In the exterior material 3 for electrical storage devices, the adhesive layer 34 is a layer provided between the barrier layer 33 and the heat-sealable resin layer 35 if necessary for firmly bonding the heat-sealable resin layer 35.

The adhesive layer 34 is formed from an adhesive capable of bonding the barrier layer 33 and the heat-sealable resin layer 35 to each other. The composition of the adhesive used for forming the adhesive layer is not particularly limited, and examples thereof include resin compositions containing an acid-modified polyolefin. Examples of the acid-modified polyolefin include those identical to the acid-modified polyolefins exemplified for the first polyolefin layer 12a and the second polyolefin layer 12b.

The thickness of the adhesive layer 34 is, for example, about 1 to 40 preferably about 2 to 30 μm.
(Heat-Sealable Resin Layer 35)

In the exterior material 3 for electrical storage devices, the heat-sealable resin layer 35 is a layer which corresponds to an innermost layer and performs a function of hermetically sealing the electrical storage device element by heat-sealing the heat-sealable resin layer during construction of the electrical storage device.

The resin component to be used in the heat-sealable resin layer 35 is not particularly limited as long as it can be heat-welded, and examples thereof include polyolefins and cyclic polyolefins.

Specific examples of the polyolefin include polyethylene such as low-density polyethylene, medium-density polyethylene, high-density polyethylene and linear low-density polyethylene; crystalline or noncrystalline polypropylene such as homopolypropylene, block copolymers of polypropylene (e.g. block copolymers of propylene and ethylene) and random copolymers of polypropylene (e.g. random copolymers of propylene and ethylene); terpolymers of ethylene-butene-propylene; and the like. Among these polyolefins, polyethylene and polypropylene are preferred.

The cyclic polyolefin is a copolymer of an olefin and a cyclic monomer, and examples of the olefin as a constituent monomer of the cyclic polyolefin include ethylene, propylene, 4-methyl-1-pentene, butadiene and isoprene. Examples of the cyclic monomer as a constituent monomer of the cyclic polyolefin include cyclic alkenes such as norbornene, specifically cyclic dienes such as cyclopentadiene, dicyclopentadiene, cyclohexadiene and norbornadiene. Among these polyolefins, cyclic alkenes are preferable, and norbornene is further preferable. Examples of the constituent monomer include styrene.

Among these resin components, crystalline or noncrystalline polyolefins, cyclic polyolefins and blend polymers thereof are preferable, and polyethylene, polypropylene, copolymers of ethylene and norbornene, and blend polymers of two or more thereof are more preferable.

The heat-sealable resin layer 35 may be formed from one resin component alone, or may be formed from a blend polymer obtained by combining two or more resin components. Further, the heat-sealable resin layer 35 may be formed of only one layer, but may be formed of two or more layers with the same resin component or different resin components. It is particularly preferable that the second polyolefin layer 12b and the heat-sealable resin layer 35 have the same resin because adhesion between these layers is improved.

The thickness of the heat-sealable resin layer 35 is not particularly limited, and is, for example, about 2 to 2000 µm, preferably about 5 to 1000 µm, still more preferably about 10 to 500 µm.

2. Electrical Storage Device

The electrical storage device 10 of the present disclosure includes the electrical storage device element 4 including at least a positive electrode, a negative electrode and an electrolyte; the exterior material 3 for electrical storage devices that seals the electrical storage device element 4; and the metal terminal 2 electrically connected to each of the positive electrode and the negative electrode and protruding to the outside of the exterior material 3 for electrical storage devices. In the electrical storage device 10 of the present disclosure, the adhesive film 1 for metal terminal according to the present disclosure is interposed between the metal terminal 2 and the exterior material 3 for electrical storage devices. That is, the electrical storage device 10 of the present disclosure can be manufactured by a method including the step of interposing the adhesive film 1 for metal terminal according to the present disclosure between the metal terminal 2 and the exterior material 3 for electrical storage devices.

Specifically, the electrical storage device element 4 including at least a positive electrode, a negative electrode and an electrolyte is covered with the exterior material 3 for electrical storage devices such that a flange portion (a region where the heat-sealable resin layers 35 contact each other, the region being a peripheral edge portion 3a of the exterior material for electrical storage devices) of the exterior material for electrical storage devices can be formed on the peripheral edge of the electrical storage device element 4, where the adhesive film 1 for metal terminal according to the present disclosure is interposed between the metal terminal 2 and the heat-sealable resin layer 35 while the metal terminal 2 connected to each of the positive electrode and the negative electrode protrudes to the outside, and the heat-sealable resin layers 35 at the flange portion are heat-sealed to each other, thereby providing the electrical storage device 10 using the exterior material 3 for electrical storage devices. When the electrical storage device element 4 is stored using the exterior material 3 for electrical storage devices, the heat-sealable resin layer 35 of the exterior material 3 for electrical storage devices is on the inner side (a surface contacting the electrical storage device element 4).

The exterior material for electrical storage devices according to the present disclosure can be suitably used for electrical storage devices such as batteries (including condensers, capacitors and the like.). The exterior material for electrical storage devices according to the present disclosure may be used for either primary batteries or secondary batteries, and is preferably used for secondary batteries. The type of a secondary battery to which the exterior material for electrical storage devices according to the present disclosure is applied is not particularly limited, and examples thereof include lithium ion batteries, lithium ion polymer batteries, solid-state batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Of these secondary batteries, preferred subjects to which the exterior material for electrical storage devices according to the present disclosure is applied include lithium ion batteries and lithium ion polymer batteries.

EXAMPLES

Hereinafter, the present disclosure will be described in detail by way of examples and comparative examples. However, the present disclosure is not limited to examples.

<Manufacturing of Adhesive Film for Metal Terminal>

Example 1

Maleic anhydride-modified polypropylene (PPa) was provided as a polyolefin for forming a first polyolefin layer, polypropylene (PP) was provided as a polyolefin for forming a second polyolefin layer, and an unstretched polypropylene film (CPP, homopolypropylene, thickness: 50 µm) was provided as a base material. As a material for forming the first polyolefin layer, a particularly highly flexible material, which had not been used for conventional adhesive films for metal terminal, was used so that the layer had a restoration rate as described in Table 1. Maleic anhydride-modified polypropylene (PPa) was extruded onto one surface of the base material (CPP) by a T-die extruder to form a first polypropylene layer (thickness: 50 µm), and polypropylene (PP) was extruded onto the other surface of the base material (CPP) by a T-die extruder to form a second polypropylene layer (thickness: 50 μm), thereby obtaining an adhesive film for metal terminal in which a first polyolefin layer (50 μm, PPa layer), a base material (50 μm, CPP layer) and a second polyolefin layer (50 μm, PP layer) were laminated in this order.

Example 2

Maleic anhydride-modified polypropylene (PPa) colored black with carbon black was provided as a polyolefin for forming a first polyolefin layer, polypropylene (PP) was provided as a polyolefin for forming a second polyolefin layer, and an unstretched polypropylene film (CPP, homopolypropylene, thickness: 50 μm) was provided as a base material. As a material for forming the first polyolefin layer, a highly flexible material, which had not been used for conventional adhesive films for metal terminal, was used so that the layer had a restoration rate as described in Table 1. Maleic anhydride-modified polypropylene (PPa) colored black with carbon black was extruded onto one surface of the base material (CPP) by a T-die extruder to form a first polypropylene layer (thickness: 50 μm), and polypropylene (PP) was extruded onto the other surface of the base material (CPP) by a T-die extruder to form a second polypropylene layer (thickness: 50 μm), thereby obtaining an adhesive film for metal terminal in which a first polyolefin layer (50 μm, PPa layer), a base material (50 μm, CPP layer) and a second polyolefin layer (50 μm, PP layer) were laminated in this order.

Example 3

Maleic anhydride-modified polypropylene (PPa) as a polyolefin for forming a first polyolefin layer, polypropylene (PP) was provided as a polyolefin for forming a second polyolefin layer, and a polypropylene film (PP) colored black with carbon black was provided as a base material. As materials for forming the first polyolefin layer and the base materials, highly flexible materials, which had not been used for conventional adhesive films for metal terminal, were used so that the layers each had a restoration rate as described in Table 1. Polypropylene (PP) was extruded by a T-die extruder to form a base material (thickness: 30 μm), maleic anhydride-modified polypropylene (PPa) was extruded onto one surface of the base material (PP) by a T-die extruder to form a first polypropylene layer (thickness: 50 μm), and polypropylene (PP) was extruded onto the other surface of the base material (PP, thickness: 30 μm) by a T-die extruder to form a second polypropylene layer (thickness: 20 μm), thereby obtaining an adhesive film for metal terminal in which a first polyolefin layer (50 μm, PPa layer), a base material (30 μm, PP layer) and a second polyolefin layer (20 μm, PP layer) were laminated in this order.

Comparative Example 1

Maleic anhydride-modified polypropylene (PPa) was provided as a polyolefin for forming a first polyolefin layer, maleic anhydride-modified polypropylene (PPa) was provided as a polyolefin for forming a second polyolefin layer, and a polypropylene film (PP, homopolypropylene) was provided as a base material. Using the resins for the layers, multilayer air-cooling inflation molding was performed to obtain an adhesive film for metal terminal in which a first polyolefin layer (50 μm, PPa layer), a base material (50 μm, PP layer) and a second polyolefin layer (50 μm, PPa layer) were laminated in this order.

Comparative Example 2

Maleic anhydride-modified polypropylene (PPa) was provided as a polyolefin for forming a first polyolefin layer, maleic anhydride-modified polypropylene (PPa) was provided as a polyolefin for forming a second polyolefin layer, and a polypropylene film (PP, homopolypropylene) was provided as a base material. Using the resins for the layers, multilayer air-cooling inflation molding was performed to obtain an adhesive film for metal terminal in which a first polyolefin layer (35 μm, PPa layer), a base material (80 μm, PP layer) and a second polyolefin layer (35 μm, PPa layer) were laminated in this order.

The restoration rate of each of the layers of the adhesive films for metal terminal shown in Table 1 is adjusted by the molecular weight, melting point and MFR of the resin forming each layer, and conditions of a T-die (e.g. the extrusion width from the T-die, the draw ratio, the draw speed and the heat treatment temperature) in manufacturing of the adhesive film 1 for metal terminal.

<Restoration Rate Measurement Conditions>

The restoration rate of each of the first polyolefin layer, the base material and the second polyolefin layer of each of the adhesive films for metal terminal of examples and comparative examples were measured. As pretreatment of a sample to be measured, the adhesive film for metal terminal is cut to a length of 30 mm and a width of 15 mm. Next, the sample was embedded in epoxy cold implant resin and dried for about 1 day. Thereafter, using a mechanical polishing apparatus Tegrapol-35 manufactured by Marumoto Struers K.K., a cross-section obtained by cutting in a transverse direction was polished to set the surface roughness of the cross-section of the sample to about 1.0 μm. The measurement by an indentation method was performed using PICODENTOR HM-500 manufactured by FISCHER INSTRUMENTS K.K. The measurement was performed by pressing an indenter in a perpendicular direction to a thickness-direction cross-section (central part in the thickness direction) of a layer to be measured. The measurement conditions are as follows.

(Measurement Conditions)

A load of 10 mN.

A load application speed of 1 mN/10 seconds.

A retention time of 10 seconds.

A load releasing speed of 1 mN/10 seconds.

The indenter is a Vickers indenter having an angle between opposite surfaces of a regular quadrangular pyramid-shaped tip end portion of 136°.

A measurement temperature of 25° C.

Measured value: an average of a total of eight measured values obtained by measuring ten times with the measurement location changed each time, and then excluding one maximum value and one minimum value.

Figure 10:
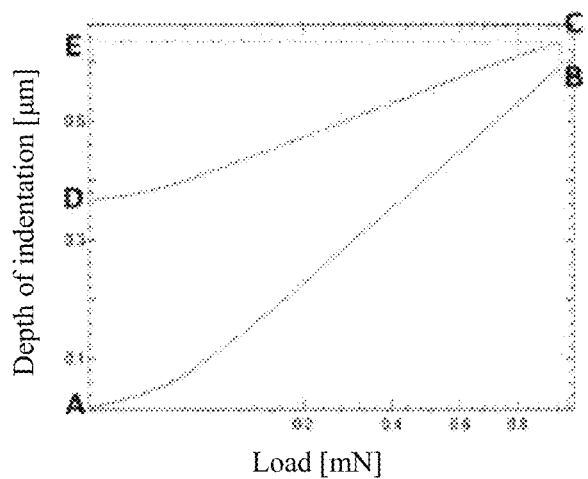
FIG. 10 is an image diagram of a graph showing a relationship between a depth of indentation (μm) and a load (mN) which is obtained by measuring a restoration rate.

An image diagram of a graph showing a relationship between a depth of indentation (μm) and a load (mN) which is obtained by the measurement of a restoration rate is shown in FIG. 10. In the graph of FIG. 10, the restoration rate is calculated in accordance with the following expression.

(Area of region surrounded by DCED/area of region surrounded by ABCEA)×100

Area of ABCEA: total work (nJ)

Area of DCED: work of elastic deformation (nJ)

[Bending Test]

Figure 8:
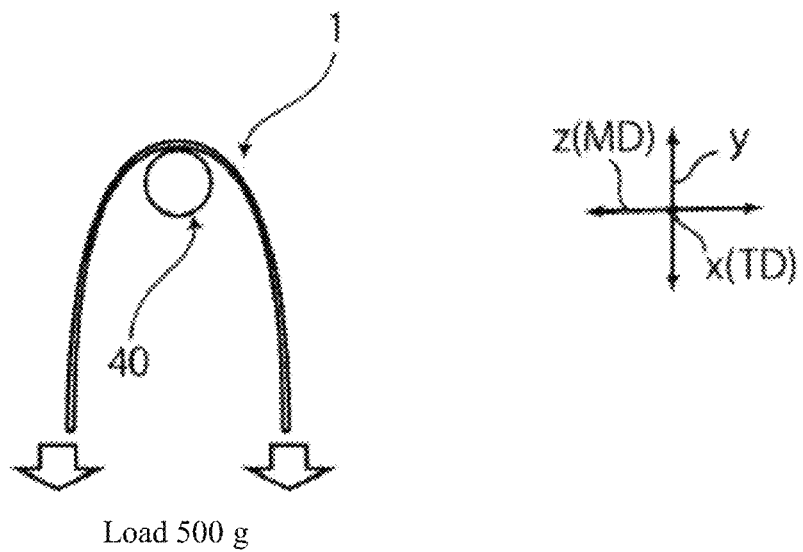
FIG. 8 is a schematic diagram for illustrating a bending test method in an example.

Each of the adhesive films for metal terminal which had been obtained in Examples and Comparative Examples was cut to a size of 100 mm in length (MD) and 15 mm in width (TD). As shown in the schematic diagram of FIG. 8, an adhesive film was wound around a mandrel 40 using a mandrel testing machine (φ2 mm metal rod). Here, a surface of the adhesive film for metal terminal on the first polyolefin layer side, which is a surface to be brought into close contact with the metal terminal, was made to contact the metal rod. In addition, the adhesive film for metal terminal was wound in a machine direction around the metal terminal so as to contact the metal rod by 15 mm in TD. Next, a bending test was conducted with a load of 500 g applied downward to the adhesive film for metal terminal, the adhesive film for metal terminal was visually observed, and the adhesive film was evaluated for whitening and winding marks in accordance with the following criteria. The results are shown in Table 1.

(Whitening)
- A: There is no whitening in the wound portion of the adhesive film for metal terminal.
- B: There is whitening in the wound portion of the adhesive film for metal terminal.

(Winding Marks)
- A: There are no winding marks in the wound portion of the adhesive film for metal terminal.
- B: Winding marks in the wound portion of the adhesive film for metal terminal are slightly observed.
- C: Winding marks in the wound portion of the adhesive film for metal terminal are clearly observed.

<Size of Curl>

Figure 9:
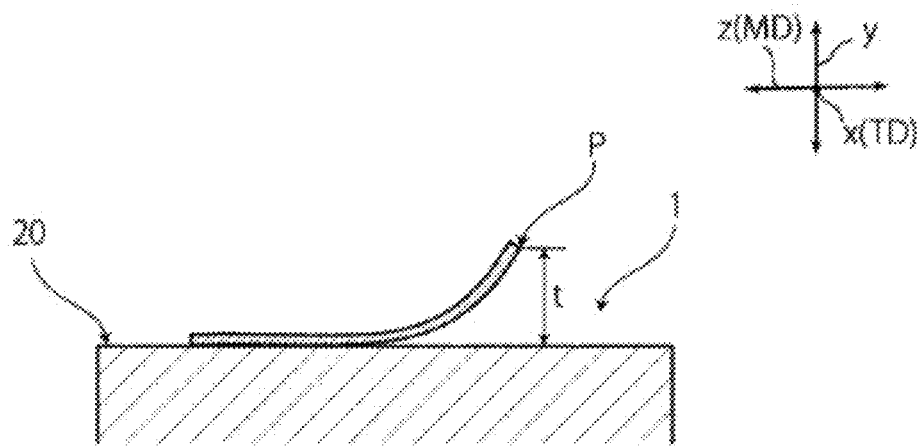
FIG. 9 is a schematic diagram for illustrating a method for the size of curl in an example.

For each adhesive film for metal terminal immediately after the <bending test> was conducted, the adhesive film for metal terminal was bonded to a horizontal plane 20 with a double-sided tape as shown in FIG. 9. Here, the adhesive film for metal terminal was 100 mm in length (MD), and a half thereof, i.e. 50 mm, was constituted by the portion bonded to the horizontal plane. Next, the maximum value t of the distance between the horizontal plane 20 and the end part P in a perpendicular direction y was defined as a maximum height of the curled portion, and the average of values obtained by measuring the maximum height for 10 test samples using a Digimatic height gauge (HD-30 AX manufactured by Mitutoyo Corporation) was defined as a size of the curl. The results are shown in Table 1.

In the adhesive films for metal terminal in Examples 1 to 3, the restoration rate measured by pressing an indenter in a perpendicular direction to a thickness-direction cross-section of the first polyolefin layer is 46.0% or more. In the adhesive films for metal terminal in Examples 1 to 3, when a flat-shaped adhesive film for metal terminal is wound into a roll and then unwound, the adhesive film for metal terminal easily returns to the flat shape before the adhesive film is wound, and the curl of the cut adhesive film for metal terminal is suitably suppressed.

As described above, the present disclosure provides inventions of aspects as described below.

Item 1. An adhesive film for metal terminal, which is interposed between a metal terminal electrically connected to an electrode of an electrical storage device element and an exterior material for electrical storage devices that seals the electrical storage device element, wherein the adhesive film for metal terminal includes a laminated body including, in the following order: a first polyolefin layer disposed on the metal terminal side; a base material; and a second polyolefin layer disposed on the side of the exterior material for electrical storage devices, and a restoration rate measured by pressing an indenter in a perpendicular direction to a thickness-direction cross-section of the first polyolefin layer is 46.0% or more under the following measurement conditions:

<Restoration Rate Measurement Conditions>
- A load of 10 mN.
- A load application speed of 1 mN/10 seconds.
- A retention time of 10 seconds.
- A load releasing speed of 1 mN/10 seconds.
- The indenter is a Vickers indenter having an angle between opposite surfaces of a regular quadrangular pyramid-shaped tip end portion of 136°.
- A measurement temperature of 25° C.
- Measured value: an average of a total of eight measured values obtained by measuring ten times with the measurement location changed each time, and then excluding one maximum value and one minimum value.

Item 2. The adhesive film for metal terminal according to item 1, in which the restoration rate measured by pressing an indenter in a perpendicular direction to a thickness-direction cross-section of the base material is 46.0% or more under the restoration rate measurement conditions.

TABLE 1

|  |  |  | Restoration rate of thickness (%) | Bending test | | |
| --- | --- | --- | --- | --- | --- | --- |
|  | Laminated configuration | Resin |  | Size of curl (mm) | Whitening | Winding mark |
| Example 1 | First polyolefin layer | PPa | 54.4 | 1 | A | A |
|  | Base material | CPP | 51.6 |  |  |  |
|  | Second polyolefin layer | PP | 51.4 |  |  |  |
| Example 2 | First polyolefin layer | PPa | 49.1 | 4 | A | B |
|  | Base material | CPP | 50.8 |  |  |  |
|  | Second polyolefin layer | PP | 48.9 |  |  |  |
| Example 3 | First polyolefin layer | PPa | 47.8 | 6 | A | B |
|  | Base material | PP | 48.3 |  |  |  |
|  | Second polyolefin layer | PP | 47.7 |  |  |  |
| Comparative Example 1 | First polyolefin layer | PPa | 44.9 | 14 | B | C |
|  | Base material | PP | 33.1 |  |  |  |
|  | Second polyolefin layer | PPa | 44.9 |  |  |  |
| Comparative Example 2 | First polyolefin layer | PPa | 44.7 | 10 | B | C |
|  | Base material | PP | 45.1 |  |  |  |
|  | Second polyolefin layer | PPa | 44.7 |  |  |  |

Item 3. The adhesive film for metal terminal according to item 1 or 2, in which the restoration rate measured by pressing an indenter in a perpendicular direction to a thickness-direction cross-section of the second polyolefin layer is 46.0% or more under the restoration rate measurement conditions.

Item 4. The adhesive film for metal terminal according to any one of items 1 to 3, in which a thickness of the first polyolefin layer is 60 μm or less.

Item 5. The adhesive film for metal terminal according to any one of items 1 to 4, in which a thickness of the base material is 60 μm or less.

Item 6. The adhesive film for metal terminal according to any one of items 1 to 5, in which a thickness of the second polyolefin layer is 60 μm or less.

Item 7. The adhesive film for metal terminal according to any one of items 1 to 6, in which a thickness of the adhesive film for metal terminal is 180 μm or less.

Item 8. The adhesive film for metal terminal according to any one of items 1 to 7, in which the first polyolefin layer contains a pigment.

Item 9. The adhesive film for metal terminal according to any one of items 1 to 8, in which the base material contains a polyolefin backbone.

Item 10. A method for manufacturing an adhesive film for metal terminal, which is interposed between a metal terminal electrically connected to an electrode of an electrical storage device element and an exterior material for electrical storage devices that seals the electrical storage device element,
　in which the adhesive film for metal terminal includes a laminated body including, in the following order: a first polyolefin layer disposed on the metal terminal side; a base material; and a second polyolefin layer disposed on the side of the exterior material for electrical storage devices,
　the method includes the step of preparing a laminated body including the first polyolefin layer, the base material and the second polyolefin layer in this order, and
　a restoration rate measured by pressing an indenter in a perpendicular direction to a thickness-direction cross-section of the first polyolefin layer is 46.0% or more under the following measurement conditions:
<Restoration Rate Measurement Conditions>
　A load of 10 mN.
　A load application speed of 1 mN/10 seconds.
　A retention time of 10 seconds.
　A load releasing speed of 1 mN/10 seconds.
　The indenter is a Vickers indenter having an angle between opposite surfaces of a regular quadrangular pyramid-shaped tip end portion of 136°.
　A measurement temperature of 25° C.
　Measured value: an average of a total of eight measured values obtained by measuring ten times with the measurement location changed each time, and then excluding one maximum value and one minimum value.

Item 11. A metal terminal with an adhesive film for metal terminal in which the adhesive film for metal terminal according to any one of items 1 to 9 is attached to a metal terminal.

Item 12. An electrical storage device including: the electrical storage device element including at least a positive electrode, a negative electrode and an electrolyte; the exterior material for electrical storage devices that seals the electrical storage device element; and the metal terminal electrically connected to each of the positive electrode and the negative electrode and protruding to the outside of the exterior material for electrical storage devices, in which the adhesive film for metal terminal according to any one of items 1 to 9 is interposed between the metal terminal and the exterior material for electrical storage devices.

Item 13. A method for manufacturing an electrical storage device including: the electrical storage device element including at least a positive electrode, a negative electrode and an electrolyte; the exterior material for electrical storage devices that seals the electrical storage device element; and the metal terminal electrically connected to each of the positive electrode and the negative electrode and protruding to the outside of the exterior material for electrical storage devices,
　the method including the step of interposing the adhesive film for metal terminal according to any one of items 1 to 9 between the metal terminal and the exterior material for electrical storage devices, and sealing the electrical storage device element with the exterior material for electrical storage devices.

DESCRIPTION OF REFERENCE SIGNS

1: Adhesive film for metal terminal
2: Metal terminal
3: Exterior material for electrical storage devices
3a: Peripheral edge portion of exterior material for electrical storage devices
4: Electrical storage device element
10: Electrical storage device
11: Base material
12a: First polyolefin layer
12b: Second polyolefin layer
13: Adhesion promotor layer
20: Horizontal plane
31: Base material layer
32: Adhesive agent layer
33: Barrier layer
34: Adhesive layer
35: Heat-sealable resin layer
40: Mandrel

The invention claimed is:
1. An adhesive film for metal terminal, which is interposed between a metal terminal electrically connected to an electrode of an electrical storage device element and an exterior material for electrical storage devices that seals the electrical storage device element,
　wherein the adhesive film for metal terminal includes a laminated body including, in the following order: a first polyolefin layer disposed on the metal terminal side; a base material; and a second polyolefin layer disposed on the side of the exterior material for electrical storage devices, and
　a restoration rate measured by pressing an indenter in a perpendicular direction to a thickness-direction cross-section of the first polyolefin layer is 46.0% or more under the following measurement conditions:
　<restoration rate measurement conditions>
　a load of 10 mN;
　a load application speed of 1 mN/10 seconds;
　a retention time of 10 seconds;
　a load releasing speed of 1 mN/10 seconds;
　indenter: Vickers indenter in which the facing angle of a regular quadrangular pyramid-shaped tip end portion is 136°;
　a measurement temperature of 25° C.; and measured value: an average of a total of eight measured values obtained by measuring ten times with the measurement location changed each time, and then excluding one maximum value and one minimum value.

2. The adhesive film for metal terminal according to claim 1, wherein the restoration rate measured by pressing an indenter in a perpendicular direction to a thickness-direction cross-section of the base material is 46.0% or more under the restoration rate measurement conditions.

3. The adhesive film for metal terminal according to claim 1, wherein the restoration rate measured by pressing an indenter in a perpendicular direction to a thickness-direction cross-section of the second polyolefin layer is 46.0% or more under the restoration rate measurement conditions.

4. The adhesive film for metal terminal according to claim 1, wherein a thickness of the first polyolefin layer is 60 μm or less.

5. The adhesive film for metal terminal according to claim 1, wherein a thickness of the base material is 60 μm or less.

6. The adhesive film for metal terminal according to claim 1, wherein a thickness of the second polyolefin layer is 60 μm or less.

7. The adhesive film for metal terminal according to claim 1, wherein a thickness of the adhesive film for metal terminal is 180 μm or less.

8. The adhesive film for metal terminal according to claim 1, wherein the first polyolefin layer contains a pigment.

9. The adhesive film for metal terminal according to claim 1, wherein the base material contains a polyolefin backbone.

10. The adhesive film for metal terminal according to claim 1, wherein a melt mass flow rate of the first polyolefin layer or the second polyolefin layer at 230° C. is 5 g/10 min or more and 11 g/10 min or less.

11. The adhesive film for metal terminal according to claim 1, wherein a melting point of the first polyolefin layer or the second polyolefin layer is 120° C. or higher and 160° C. or lower.

12. The adhesive film for metal terminal according to claim 1, wherein a ratio of the thickness of the base material to the total thickness of the first polyolefin layer and the second polyolefin layer is 0.3 or more and 1.0 or less.

13. The adhesive film for metal terminal according to claim 1, wherein a melt mass flow rate of the base material at 230° C. is 1 g/10 min or more and 8 g/10 min or less.

14. The adhesive film for metal terminal according to claim 1, wherein:
a melt mass flow rate of the first polyolefin layer or the second polyolefin layer at 230° C. is 5 g/10 min or more and 11 g/10 min or less; and
a melting point of the first polyolefin layer or the second polyolefin layer is 120° C. or higher and 160° C. or lower.

15. The adhesive film for metal terminal according to claim 1, wherein:
a melt mass flow rate of the first polyolefin layer or the second polyolefin layer at 230° C. is 5 g/10 min or more and 11 g/10 min or less;
a melting point of the first polyolefin layer or the second polyolefin layer is 120° C. or higher and 160° C. or lower; and
a ratio of the thickness of the base material to the total thickness of the first polyolefin layer and the second polyolefin layer is 0.3 or more and 1.0 or less.

16. The adhesive film for metal terminal according to claim 1, wherein:
a melt mass flow rate of the first polyolefin layer or the second polyolefin layer at 230° C. is 5 g/10 min or more and 11 g/10 min or less;
a melting point of the first polyolefin layer or the second polyolefin layer is 120° C. or higher and 160° C. or lower;
a ratio of the thickness of the base material to the total thickness of the first polyolefin layer and the second polyolefin layer is 0.3 or more and 1.0 or less; and
a melt mass flow rate of the base material at 230° C. is 1 g/10 min or more and 8 g/10 min or less.

17. A metal terminal with an adhesive film for metal terminal, wherein the adhesive film for metal terminal according to claim 1 is attached to a metal terminal.

18. An electrical storage device comprising:
the electrical storage device element including at least a positive electrode, a negative electrode and an electrolyte;
the exterior material for electrical storage devices that seals the electrical storage device element; and
the metal terminal electrically connected to each of the positive electrode and the negative electrode and protruding to the outside of the exterior material for electrical storage devices,
wherein the adhesive film for metal terminal according to claim 1 is interposed between the metal terminal and the exterior material for electrical storage devices.

19. A method for manufacturing an electrical storage device including: the electrical storage device element including at least a positive electrode, a negative electrode and an electrolyte; the exterior material for electrical storage devices that seals the electrical storage device element; and the metal terminal electrically connected to each of the positive electrode and the negative electrode and protruding to the outside of the exterior material for electrical storage devices,
the method comprising the step of interposing the adhesive film for metal terminal according to claim 1 between the metal terminal and the exterior material for electrical storage devices, and sealing the electrical storage device element with the exterior material for electrical storage devices.

20. A method for manufacturing an adhesive film for metal terminal, which is interposed between a metal terminal electrically connected to an electrode of an electrical storage device element and an exterior material for electrical storage devices that seals the electrical storage device element,
in which the adhesive film for metal terminal includes a laminated body including, in the following order: a first polyolefin layer disposed on the metal terminal side; a base material; and a second polyolefin layer disposed on the side of the exterior material for electrical storage devices,
the method comprises the step of preparing a laminated body including the first polyolefin layer, the base material and the second polyolefin layer in this order, and
a restoration rate measured by pressing an indenter in a perpendicular direction to a thickness-direction cross-section of the first polyolefin layer is 46.0% or more under the following measurement conditions:
<restoration rate measurement conditions>
a load of 10 mN;
a load application speed of 1 mN/10 seconds;
a retention time of 10 seconds;
a load releasing speed of 1 mN/10 seconds;

indenter: Vickers indenter in which the facing angle of a regular quadrangular pyramid-shaped tip end portion is 136°;

a measurement temperature of 25° C.; and measured value: an average of a total of eight measured values obtained by measuring ten times with the measurement location changed each time, and then excluding one maximum value and one minimum value.

* * * * *